United States Patent [19]

Luckenbach

[11] 4,081,508
[45] Mar. 28, 1978

[54] PROCESS FOR REDUCING FLUE GAS CONTAMINANTS FROM FLUID CRACKING CATALYST REGENERATOR

[75] Inventor: Edward C. Luckenbach, Mountainside, N.J.

[73] Assignee: Exxon Research & Engineering Co., Linden, N.J.

[21] Appl. No.: 583,555

[22] Filed: Jun. 4, 1975

[51] Int. Cl.$^2$ .............................................. B01D 47/00
[52] U.S. Cl. ...................... 423/210; 55/84; 261/DIG. 54; 252/416; 252/417
[58] Field of Search ............. 55/84, 73, 90, 257, 55/258, 27, 91, 93, 94; 252/416, 417; 261/DIG. 54; 208/120; 23/288 B; 423/210

[56] References Cited

U.S. PATENT DOCUMENTS

| | | | |
|---|---|---|---|
| 3,012,082 | 12/1961 | Kelly, Jr. et al | 252/416 X |
| 3,053,914 | 9/1962 | Frank et al. | 252/416 X |
| 3,087,898 | 4/1963 | Pfeiffer | 252/416 |
| 3,215,415 | 11/1965 | Stephens et al. | 261/DIG. 54 |
| 3,357,915 | 12/1967 | Young | 252/416 |
| 3,473,331 | 10/1969 | Fernandes | 55/222 X |
| 3,681,009 | 8/1972 | Horsley | 55/15 X |
| 3,690,044 | 9/1972 | Boresta | 261/DIG. 54 |
| 3,755,202 | 8/1973 | Katsobashvili et al. | 252/416 X |
| 3,768,234 | 10/1973 | Hardison | 261/DIG. 54 |
| 3,838,036 | 9/1974 | Stine et al. | 208/120 |
| 3,844,973 | 10/1974 | Stine et al. | 208/120 X |
| 3,854,300 | 12/1974 | Gerhold | 55/84 X |
| 3,898,308 | 8/1925 | Baum | 261/DIG. 54 |

FOREIGN PATENT DOCUMENTS 1,191,954   8/1968   United Kingdom .................... 55/84

Primary Examiner—Bernard Nozick
Attorney, Agent, or Firm—Roy J. Ott; James H. Callwood

[57] ABSTRACT

Noxious emissions produced in the process of regenerating catalysts employed in the catalytic cracking of hydrocarbons are reduced by burning the coke on the spent catalyst in a regenerator operated at a temperature greater than 1200° F. to produce flue gas containing less than 2.0 vol. % carbon monoxide, expanding the flue gas from the regenerator through a turbine to reduce the pressure of said flue gas, recovering and utilizing energy produced from said expansion, introducing the expanded gas into a venturi structure, contacting said expanded gas with a low pressure stream of an aqueous scrubbing mixture, passing said flue gas and said scrubbing mixture through a constricted passage of said venturi structure to increase the turbulence and velocity of the liquid and gaseous streams thereby producing intimate contact thereof, discharging said mixture of gas and scrubbing liquid into a separation zone, and separating said mixture of gas and scrubbing liquid into a liquid portion and a gaseous portion having a reduced content of solid catalytic particulates and acidic gases.

8 Claims, 1 Drawing Figure

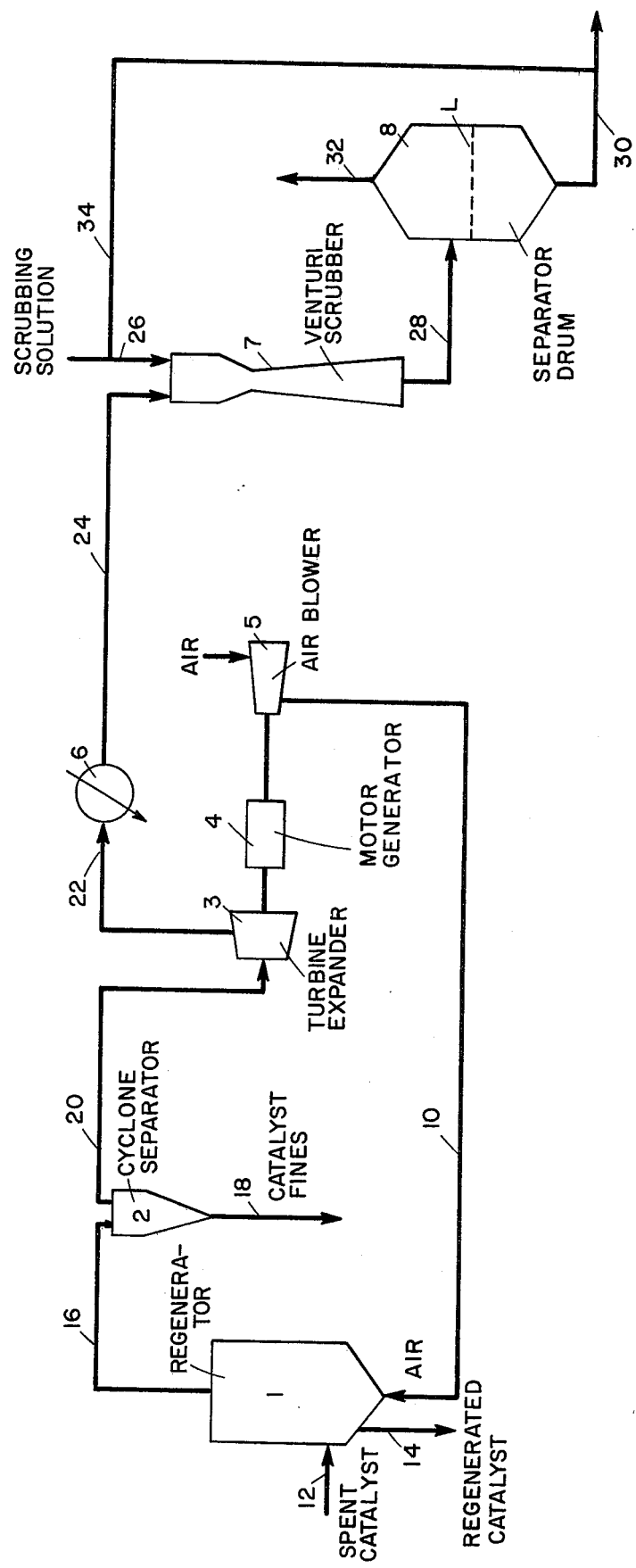

PROCESS FOR REDUCING FLUE GAS CONTAMINANTS FROM FLUID CRACKING CATALYST REGENERATOR

BACKGROUND OF THE INVENTION

1. Field of the Invention

This invention relates to a method for the removal of solid particulates and acidic gases from gaseous mixtures. More particularly, this invention relates to a process for reducing flue gases contaminants which are ordinarily present in flue gases produced in the process of regenerating catalysts employed in the catalytic cracking of hydrocarbons.

2. Description of the Prior Art

The flue gases produced in the process of regenerating catalysts employed in the catalytic cracking of hydrocarbons contain solid particulates, including catalyst fines, and various noxious gases, such as carbon monoxide, sulfur oxides, and ammonia. It is desirable to lower the level of such contaminants from the flue gas before it is introduced into the atmosphere so as to minimize the detrimental effect of these pollutants to the ecology.

Many methods have been used heretofore to reduce the solid particulate content, the acidic gas content or both of a flue gas stream. These conventional methods include centrifugal particle separation, electrostatic precipitation, adsorption, catalytic oxidation, and a variety of other processes. The greatest disadvantage encountered in all such processes is the expense required to effect decontamination. The reason for the expense usually stems from the initial large expense of the equipment involved, such as is necessary for an electrostatic precipitator. Other processes can be operated only at a rather large recurring cost, such as adsorption processes in which the adsorbent cannot be regenerated and must continually be replaced.

It is also known that solid particulates can be removed from gases by wet scrubbing methods, including scrubbing gases and jet-ejector type venturi scrubbers in which a scrubbing liquid, under pressure, enters the venturi through a spray nozzle. The velocity of the liquid spray creates a draft in a chamber of the venturi scrubber and causes gases or vapors to be drawn into the scrubber body and through a constricted passage of the scrubber wherein intimate mixing of scrubbing liquid and gas occurs. Generally, the effluent of the scrubber is passed through a separator in which the contaminated liquid is separated from the clean gas. It is also known that acidic or basic materials may be added to the scrubbing liquid to neutralize or adsorb basic or acidic contaminants that may be present in the gas subjected to the wet scrubbing treatment.

Although many types of venturi web gas scrubbing systems have been proposed to reduce the level of particulates and acidic gases from gaseous mixtures from various processes prior to their discharge into the atmosphere, these systems have not found widespread use for reducing the contaminants normally present in flue gases produced in the process of regenerating catalysts employed in the catalytic cracking of hydrocarbons. This is, in part, due to the particular nature of the contaminants present in the flue gas, various pressure requirements and the large volumes of gases which must be handled before the flue gas from the catalyst regenerator can be discharged into the atmosphere. For example, the flue gas from a cracking catalyst regenerator will ordinarily be at a pressure of 10–30 psig and contain as much as 6–13 vol. % carbon monoxide. In order to meet pollution regulations, it is very often necessary to reduce the carbon monoxide content of the flue gas by burning the carbon monoxide in a CO boiler. Since an efficient CO boiler requires a low pressure level in the order of 0.2–1 psig, it is necessary to reduce the pressure of the flue gas from the catalyst regenerator by passage through a pressure reduction zone, such as an orifice chamber, prior to entry into the CO boiler. Unfortunately, the large volume of gas from the CO boiler is thus not at a sufficiently high enough pressure to permit the use of conventional venturi wet scrubbing systems. Accordingly, the use of a jet-ejector type of venturi scrubber has recently been proposed in application Ser. No. 369,771, filed June 13, 1973, now U.S. Pat. No. 3,970,740.

The jet-ejector venturi combines the clean-up characteristics of a venturi scrubber with the gas transport characteristics of an ejector. The caustic scrubbing liquid is supplied to the scrubber under pressure ranging from 40–120 psig in amounts varying between 20 and 100 gals./1000 cu. ft. of entering gas. The scrubbing liquid then passes through a specifically designed spray nozzle which breaks the liquid stream into droplets. These droplets have size and velocity characteristics most suitable for maximum contacting with the gas to provide the best possible scrubber efficiency. It is the velocity of the spray liquid which induces a draft into the scrubber body. The dust-laden flue gases are drawn into the body of the scrubber by the draft-inducing action of the liquid spray. The gas is intermixed with a scrubbing liquid and both enter the venturi portion of the scrubber axially. In the venturi section of the scrubber, the liquid and gas enter an area of intense turbulence. Hence, the liquid droplets strike and capture the particles in the gas stream. Also within this venturi section, compression of the gas occurs creating a differential pressure across the unit. After passing through the venturi section, the mixture of gas and droplets is sent to a separator. In the separator, the clean gas is separated from the dirty water and discharged to the atmosphere.

While many advantages are realized by employing the jet-ejector venturi scrubber for reducing the contaminants ordinarily present in flue gases produced in the process of regenerating catalysts employed in the catalytic cracking of hydrocarbons, the system has the disadvantage of requiring large volumes of high pressure water and the need for relatively expensive equipment. It has now been found that many of the disadvantages associated with the prior art devices are overcome by the practice of the present invention which produces flue gases having a low level of contamination without the need of CO boilers, high pressure/high volume water pumps, etc. which are normally associated with prior art processes.

SUMMARY OF THE INVENTION

In accordance with the invention, there is provided a process for reducing flue gas contaminants produced when spent fluid cracking catalysts having coke deposited thereon are regenerated, which comprises (1) burning the coke on the spent catalyst in a regenerator to produce a catalyst having a coke on regenerated catalyst level less than 0.3 wt. %, preferably less than 0.1 wt. %, more preferably less than 0.05 wt %, and a flue gas containing less than 2.0 preferably less than 1.0, vol. % carbon monoxide; (2) expanding the flue gas from the regenerator through a turbine to reduce the pressure of said flue gas to the range of 1.5 to 4, preferably 2 to 2.5 psig; (3) recovering and utilizing energy produced from step (2); (4) introducing said expanded gas into a venturi structure; (5) ejecting a scrubbing liquid at a pressure less than 10 psig into the venturi structure for mixture with said flue gas; (6) passing the mixture of said flue gas and said scrubbing liquid through a constricted passage of said venturi structure to increase the turbulence and velocity thereof; (7) discharging the mixture resulting from step (6) into a separator; and (8) separating said discharged mixture into a liquid portion and a gaseous portion having a reduced level of contaminants.

In accordance with the invention, the catalyst regenerator is operated so that the flue gas exiting from the regenerator will have a carbon monoxide concentration less than 2.0, preferably less than 1.0, vol. %. If local pollution requirements are particularly stringent, the catalyst regenerator may be operated in a manner to produce flue gases having carbon monoxide concentrations in the order of 0.1 vol. % or lower. Methods for producing such low levels of carbon monoxide in the regenerator flue gas have recently been developed and described in the literature, e.g., U.S. Pat. Nos. 3,838,036, 3,844,973; Dutch application 7307445 and Paper No. AM-74-18, R. J. Fahrig, 72nd Annual Meeting of the National Petroleum Refiners Association.

In general, the production of low carbon monoxide levels in the flue gas exiting from the catalyst regenerator is accomplished by contacting the spent catalyst in the regenerator at relatively high temperatures with sufficient oxygen to burn the coke and the resultant carbon monoxide to carbon dioxide. For example, the spent cracking catalyst may be regenerated by contacting the spent catalyst particles within a regeneration vessel in a first fluidized relatively dense phase regenerator zone at temperatures in the range of 1200°–1400° F. with air in an amount providing at least sufficient oxygen for complete combustion of catalyst coke, to burn a major portion of the coke from the catalyst particles and to provide a partially spent regeneration gas stream comprising carbon monoxide, carbon dioxide and oxygen and thereafter passing the partially spent regeneration gas stream and entrained catalyst particles to a second fluidized relatively dilute phase regeneration zone within the regeneration vessel and sustaining therein at a temperature of 1250°–1450° F. combustion of carbon monoxide with oxygen to substantially complete the combustion thereof to carbon dioxide. Variations of the aforedescribed process can also be employed provided that the regeneration zone is operated at a sufficiently high temperature (i.e. 1200°–1450° F., preferably 1250°–1350° F.) in the presence of sufficient oxygen to substantially complete the conversion of CO to $CO_2$.

Another method for regenerating fluid cracking catalyst to produce a flue gas containing extremely low levels of CO includes the steps of (a) passing a coke-contaminated catalyst to a first dense bed of fluidized catalyst in a regeneration zone supplied with sufficient air to oxidize said coke to a predetermined residual coke level; (b) oxidizing said coke in said first dense bed at a temperature of 1250°–1400° F. to produce partially spent regeneration gas containing CO, and regenerated catalyst having residual coke thereon; (c) passing said regenerated catalyst and partially spent regeneration gas to a dilute phase transport riser, in said regeneration zone, and therein converting CO to a desired level of $CO_2$ at a temperature of 1275°–1475° F. to produce flue gas and a regenerated catalyst; and (d) separating the thus-regenerated catalyst from said flue gas.

As regards the scrubbing liquid which is introduced into the venturi scrubber employed in the process of the invention, this is preferably water or an aqueous caustic solution which neutralizes the acidic gases present in the flue gas. It is preferable that the aqueous scrubbing mixture be maintained at a pH in the range of 5 to 7, preferably between about 6.5 and below 7. Control of the pH will determine the degree of sulfur oxide removed from the flue gas. The pH should not be maintained at a level higher than 7 in order to minimize the undesired adsorption of $CO_2$ or lower than 6 to avoid undesirable acidic corrosion of the materials of construction. Various caustic materials may be added to the aqueous scrubbing mixture in order to control the pH thereof. The basic material may be, for example, an alkali metal hydroxide, ammonia or ammonium hydroxide. Examples of suitable materials include, among others, calcium hydroxide, sodium hydroxide, potassium hydroxide, magnesium hydroxide, sodium sulfite and sodium bisulfite.

BRIEF DESCRIPTION OF THE DRAWING

The FIGURE is a diagrammatic flow plan of one embodiment of the invention.

PREFERRED EMBODIMENT OF THE INVENTION

The preferred embodiment of the invention will be described with reference to the accompanying FIGURE.

Referring to the FIGURE, air and spent fluid cracking catalyst from a conventional fluid catalytic cracking reactor (not shown) are introduced into regenerator 1 via lines 10 and 12, respectively. The catalysts which are reactivated in regenerator 1 include those catalysts which are well known and conventionally employed in the catalytic cracking of hydrocarbons. Suitable catalysts include those containing silica and/or alumina. Preferred commonly employed catalytic cracking catalysts include 3–25 wt. % of a crystalline aluminosilicate zeolitic molecular sieve embedded in a silica-alumina matrix containing 10–50 wt. % alumina. Among the well recognized typs of zeolitic molecular sieves useful herein are the "Type A", "Type Y", "Type X", mordenite, faujasite, erionite and the like. For optimum results, the zeolite molecular sieve is ion exchanged with hydrogen or ammonium ions, divalent metal ions, rare earth metals, etc., to reduce the sodium level thereof below about 2 wt. %. The spent catalyst will typically contain 1.0 to 1.5 wt. % coke catalyst.

The conditions in regenerator 1 are adjusted to produce an effluent flue gas containing less than 2.0, e.g. 0.5, vol. % CO and a carbon or regenerated catalyst of 0.1 to 0.02, e.g., 0.05, wt. %. The desired coke and CO level can generally be achieved by introducing sufficient air and heat, if required, so that the regenerator will contain a dense phase catalyst bed located in the lower zone thereof and a fluidized relatively dilute catalyst phase located in the upper region thereof. The catalyst dense phase may range from 1200° to 1400° F., e.g. 1275° F., and the temperature of the dilute phase may range from 1250° to 1450° F., for example, 1325° F. The air introduced via line 10 is in an amount such that the air/coke weight ratio ranges between about 11 and 15, e.g., 12, lb. of air/lb. of coke on spent catalyst introduced via line 12. The catalyst holdup time in the regenerator will typically range from 2 to 10, e.g. 4, minutes.

Regenerated catalyst and effluent flue gas are withdrawn via lines 14 and 16, respectively. The flue gas is passed through one or more cyclone separators 2 (only one shown) to remove catalyst fines which are discharged through line 18. The flue gas overhead from cyclone 2 is delivered to turbine expander 3 which expands and recovers power from the flue gas which is transmitted to motor/generator 4 employed to run air blower 5 for supplying air via line 10 to regenerator 1. In general, the flue gas will enter expander 3 at a temperature in the range of 1150° to 1250° F., e.g. 1220° F., and a pressure in the range of 15 to 25 psig, and exit at a temperature in the range of 800° to 1000° F., e.g. 875° F., and a pressure in the range of 1.5 to 4 psig, e.g., 2.0 psig. The expanded flue gas is carried by line 22 into cooler 6 wherein the temperature of the flue gas will preferably be reduced to a temperature of 400° to 550° F., e.g. 500° F. The cooled flue gas is then carried by line 24 into venturi scrubber 7 wherein it is contacted with the aforedescribed scrubbing solution, e.g. an aqueous solution of sodium hydroxide having a pH of 6.8, supplied via line 26. If desired, the expanded flue gas prior to its entry into venturi scrubber 7 may be cooled by spraying it with water to saturate the gaseous mixture at its dew point. Water saturating the gas prior to its introduction into the venturi scrubber will help prevent the vaporization of the scrubbing solution upon contact with a hot, water-unsaturated gas, as is known in the art.

In view of the fact that the present invention eliminates the need of a CO boiler, flue gas pressure at the entry of venturi scrubber 7 is sufficiently high so that an ordinary venturi structure may be employed without the need of large quantitites of high pressure scrubbing solution as has been heretofore required. Accordingly, the scrubbing mixture may be introduced into the ventrui scrubber at a ratio of 5 to 20 gals. of scrubbing mixture per 1000 cu. ft. of gas, preferably at a ratio of 8 to 15 gals. of scrubbing mixture per 1000 cu. ft. of flue gas measured at 1 atmosphere and 60° F. (STP). In addition, the scrubbing solution may be introduced into the venturi scrubber at a pressure of 2 to 20 psig, preferably 4 to 8 psig, e.g. 5 psig. The flue gas will generally be introduced into the venturi scrubber at a velocity of about 25 to 200 ft./sec., preferably about 50 to 100 ft./sec., e.g. 75 ft./sec. In contrast, regenerator flue gases which have been passed through a CO boiler to achieve a sufficiently low CO level, would require an electrostatic precipitator, or an adsorption tower or a jetejector venturi scrubber employing in the range of 20 to 100 gals. of scrubbing mixture per 1000 cu. ft. (STP) of gas.

To control the pH, a basic material is added to the aqueous scrubbing mixture. In a preferred embodiment of the invention, sodium hydroxide is utilized as the basic material for pH control of the scrubbing mixture. Contact of the scrubbing mixture with the incoming gaseous mixture removes sulfur oxides, ammonia, etc., from the gas by reaction with the basic material. The gas and scrubbing mixture flow through a constricted flow passage of venturi scrubber 7 whereby the velocity and turbulence of the mixture of gas and scrubbing liquid is increased with consequent cooling and condensation of the water on the solid particles in a conventional manner. The resultant mixture of gas and liquid is then removed from venturi scrubber 7 via line 28 and introduced into separator drum 8 above a level (indicated at L in the figure) of any liquid that may be present in the bottom portion thereof. Typically, the effluent stream from the venturi scrubber will have a temperature in the range of 140° to 180° F. and a pressure in the range of 0.2 to 0.1 psig.

In the separator drum, the non-condensible gaseous portion of the venturi scrubber effluent exists through stack 32. If desired, the effluent flue gas from the separator drum may be reheated above its dew point prior to discharge to the atmosphere. This may be carried out by injecting a hot gas (not shown) into the flue gas prior to discharge into the atmosphere.

The contaminated liquid scrubbing mixture will form a liquid phase in the bottom portion of separator drum 8. It will contain suspended solids such as catalyst fines and dissolved solids, such as sodium sulfates, sodium sulfites, ammonium sulfates, as well as condensible liquid contaminants such as $H_2SO_4$. If desired, a basic material such as sodium hydroxide of about 30° Be may be introduced into the liquid hold-up zone of separator drum 8 to maintain the pH of the scrubbing mixture at the desired level. Scrubbing liquid present in the separator drum is withdrawn via line 30 and, if desired, at least a portion of this liquid effluent may be recycled via lines 34 and 26 to the venturi scrubber.

What is claimed is:

1. A process for reducing flue gas contaminants produced when spent hydrocarbon cracking catalysts having coke deposited thereon are regenerated, which comprises:
    (a) burning the coke on the spent catalyst in a regenerator to produce a catalyst having a coke on regenerated catalyst level less than 0.3 wt. % and a flue gas containing less than 2.0 vol. % carbon monoxide;
    (b) expanding the flue gas from the regenerator through a turbine to reduce the pressure thereof;
    (c) recovering and utilizing energy produced from said expansion;
    (d) introducing the expanded flue gas into a venturi structure at a pressure in the range of 1.5 to 4.0 psig;
    (e) introducing an aqueous scrubbing mixture at a pressure less than 10 psig into the venturi structure for mixture with said flue gas;
    (f) passing said flue gas and said scrubbing mixture through a constricted passage of said venturi structure to increase the turbulence and velocity of the liquid and gaseous streams thereby producing intimate contact thereof;
    (g) discharging said mixture of gas and scrubbing liquid into a separation zone; and
    (h) separating said mixture of gas and scrubbing liquid into a liquid portion and a gaseous portion having a reduced content of solid catalytic particles and acidic gases.

2. The process of claim 1 wherein said scrubbing mixture contains sufficient basic material to maintain a pH in the range from about 6 to about 7.

3. The process of claim 2 wherein the CO content of the regenerator effluent flue gas is unchanged during the process steps preceding its introduction into the venturi structure.

4. The process of claim 3 wherein said scrubbing mixture is introduced into the venturi scrubber at a ratio of 5 to 20 gals. of scrubbing mixture to 1000 cu. ft. of gas.

5. The process of claim 4 wherein said catalyst regenerator is operated at a temperature above 1250° F. to produce an effluent gas containing less than 1.0 vol. % CO and a catalyst having a coke on regenerated catalyst level less than 0.1 wt. %.

6. The process of claim 5 wherein said flue gas is introduced into the venturi structure at a pressure in the range of 4 to 8 psig and said scrubbing mixture is introduced into the venturi structure at a ratio of 8 to 15 gals. per 1000 cu. ft. of gas.

7. The process of claim 6 wherein said flue gas solid contaminants include catalyst fines comprising silicaalumina and/or crystalline aluminosilicate zeolitic molecular sieves.

8. The process of claim 6 wherein said catalyst regenerator is operated at a temperature in the range of 1250° to 1350° F. to produce an effluent gas containing less than 3.0 vol. % CO.

* * * * *